Nov. 8, 1927.  1,648,048
B. A. HOCHTRITT
PIPE CLEANING MACHINE
Filed July 16, 1925  3 Sheets-Sheet 1
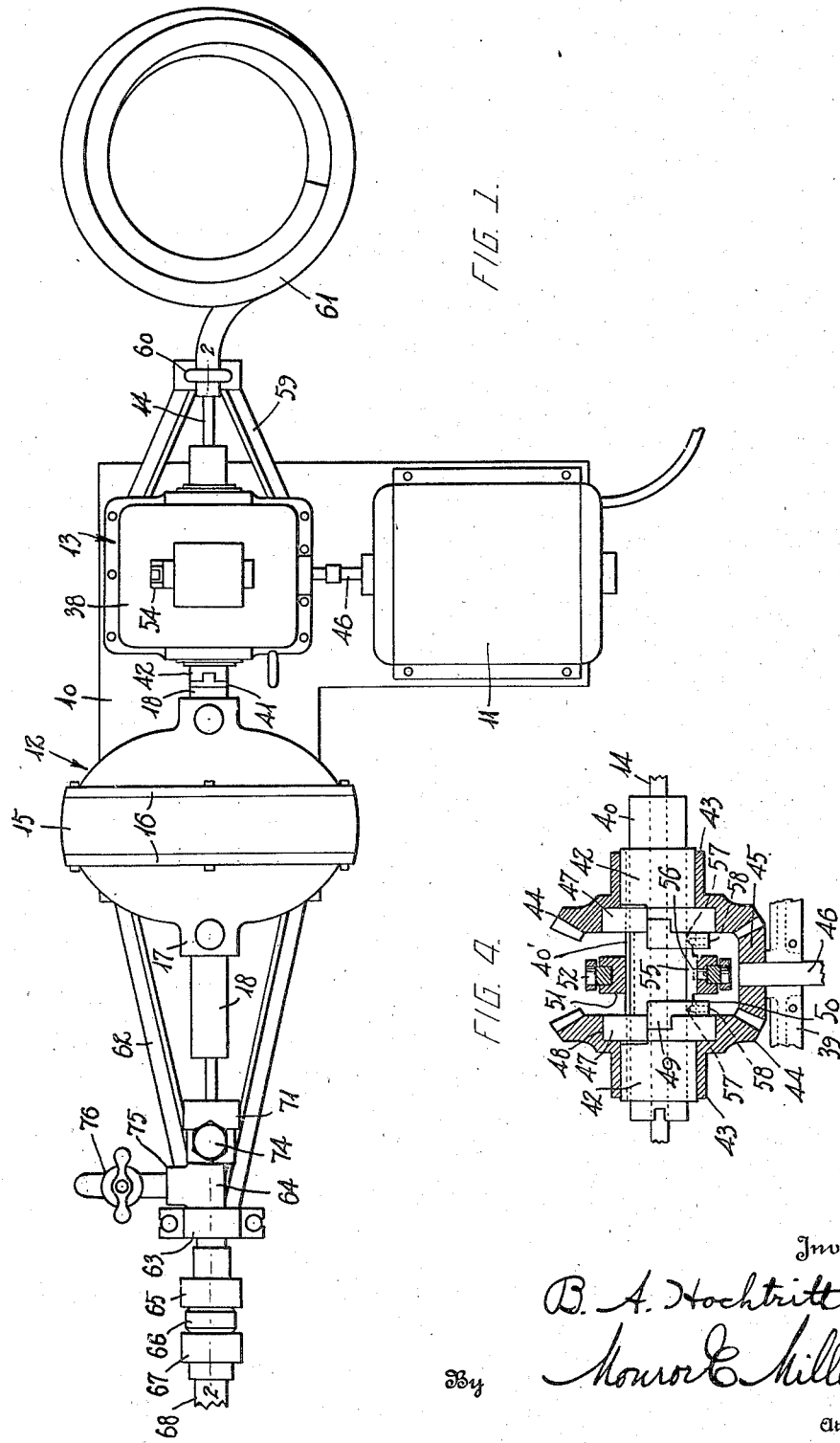
Inventor:
B. A. Hochtritt,
By Monroe E. Miller
Attorney.

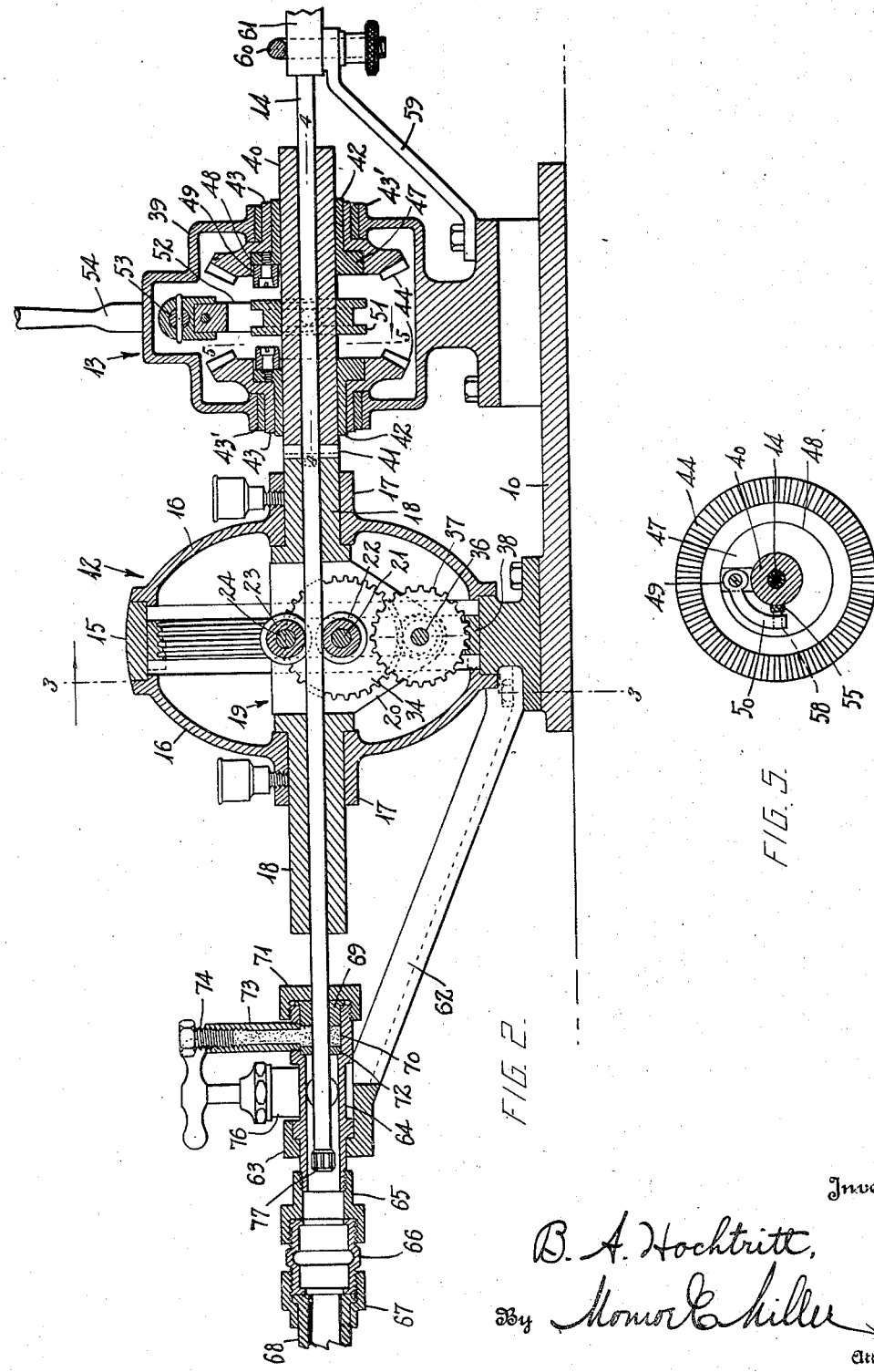

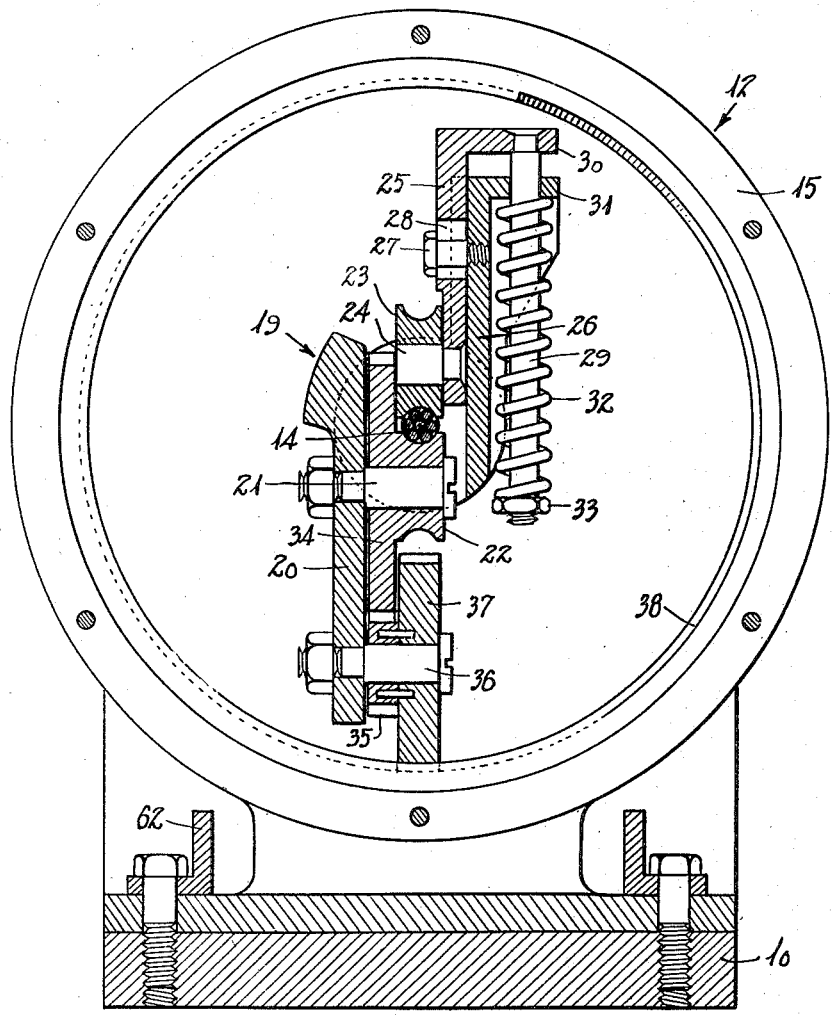

Patented Nov. 8, 1927.

1,648,048

UNITED STATES PATENT OFFICE.

BENHEART AUGUST HOCHTRITT, OF WAUSAU, WISCONSIN

PIPE-CLEANING MACHINE.

Application filed July 16, 1925. Serial No. 44,031.

The present invention relates to machines for cleaning out pipes and tubes, and aims to provide a novel and improved machine of that kind, which, although useful for other purposes also, is particularly intended for cleaning out water service pipes leading from the water mains of municipal or pubic service water supply systems to the buildings. Such water service pipes frequently become clogged or stopped up due to rust, corrosion, sediment, and other accumulations therein, and it has been found difficult if not impossible to clean out such pipes by the use of force pumps. The present machine is designed to be attached or disposed at one end of the pipe or tube to be cleaned and having a flexible shaft with a reamer, burr or other tool on the end thereof and means for rotating said shaft and advancing it into and withdrawing it from the pipe or tube so that the tool will clean the scale, sediment, and other accumulations from the inner surface of the pipe, in order that the pipe may be readily and efficiently cleaned out. The machine may also be used for other purposes for which it is suited in cleaning out pipes and tubes.

It is also an object of the invention to improve the machine generally in its construction and assembly of the component elements, so that it will be practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the machine.

Fig. 2 is an enlarged longitudinal vertical section on the line 2—2 of Fig. 1.

Fig. 3 is an enlarged cross section on the line 3—3 of Fig. 2.

Fig. 4 is a sectional detail on the line 4—4 of Fig. 2, portions being shown in plan.

Fig. 5 is a cross section on the line 5—5 of Fig. 2.

A suitable base 10 is provided on which is secured an electric motor 11 or other prime mover to supply the power for operating the shaft rotating and feeding device 12, and a clutch and reversing device 13 is connected between the motor and device 12 for stopping said device 12 and reversing the operation thereof. The devices 12 and 13 are also secured on the base, whereby the machine is portable to be readily moved from place to place.

The shaft rotating and feeding device 12 comprises a casing having the annular body 15 secured on the base 10 and opposite sides 16 secured to said body. The sides 16 of the casing have bearings 17 in which are journaled the trunnions or shaft portions 18 of a rotatable member or rotor 19 mounted in said casing. The trunnions 18 are tubular for the longitudinal passage therethrough of the flexible shaft 14 which may be of any suitable kind, so as to be capable of being rotated while bent. The rotor 19 has the yoke 20 connecting the trunnions 18, and carrying a pintle 21 on which is rotatable a grooved wheel 22 which is complemented by a companion grooved wheel 23, for the gripping of the shaft 14 between said wheels 22 and 23 to rotate the shaft with the rotor 19 and move the shaft longitudinally when said wheels 22 and 23 are rotated. The wheel 23 is rotatable on a pintle 24 secured to a slide 25 that is movable along a guide 26 with which the rotor 19 is provided opposite to the yoke 20, and a screw 27 engaging the guide 26 extends through a slot 28 in the slide to guide said slide and hold it in place against the guide 26. The wheel 23 is thus mounted on the rotor for movement toward and away from the wheel 22. A rod 29 has one end secured to an angularly extending portion 30 of the slide 25 and passes slidably through a similarly extending portion 31 of the guide 26, and a coiled wire spring 32 on the rod 29 is confined between the portion 31 and a nut 33 screwed on the opposite terminal of said rod, whereby said spring will yieldingly move the wheel 23 toward the wheel 22 to grip or clamp the shaft 14 between said wheels and cause the shaft to rotate with the rotor 19, as well as to move said shaft longitudinally when the wheel 22 is rotated.

The shaft 14 is fed lengthwise simultaneously with the rotation of the shaft. Thus, a gear wheel 34 is secured to or is integral with the wheel 22 and meshes with a pinion 35 rotatable on a second pintle 36 secured to the yoke 20, and a worm wheel 37 is secured to the pinion 35 and is rotatable on said pintle 36. The worm wheel 37 engages an internal annular worm 38 that is secured within the body 15 of the casing. The worm 38 is a ring having a helical thread on its inner periphery in order that when the rotor 19 revolves, the worm wheel 37 moving along the threads of the worm 38, will rotate the wheel 37, and the reduction gearing between the wheels 37 and 22 will rotate the wheel 22 at a comparatively slow velocity so that the shaft is moved longitudinally relatively slow while rotated at a comparatively high speed. It is apparent that when the rotor is rotated in one direction the shaft will be fed longitudinally in one direction, and when the rotation is reversed the longitudinal movement of the shaft is also reversed, so that the shaft may be advanced into and retracted from the pipe or tube by simply reversing the rotation of the rotor 19. This will also reverse the rotation of the shaft in the opposite longitudinal movements thereof to facilitate the cleaning action.

The clutch and reversing device 13 comprises a suitable casing 39 secured on the base 10, and a tubular shaft 40 extending through the casing in alinement with the rotor 19 for the passage of the shaft 14 through said shaft 40. A suitable coupling or connection 41 is provided between the corresponding end of the shaft 40 and trunnion 18, so that the rotor 19 is rotated with the shaft 40. On the shaft 40 are two sleeves 42, and the shaft 40 has a splined or key 40' which the sleeves 42 engage so that said sleeves rotate with said shaft. The hubs 43 of bevel gears 44 are rotatable on the sleeves 42 within bearings 43' with which the casing 39 is provided, and a bevel pinion 45 is disposed between and meshes with both bevel gears 44 and is secured on the armature shaft 46 of the motor 11. Thus, when the motor 11 is in operation the pinion 45 will rotate the gears 44 in opposite directions, and clutches are provided to alternately connect the gears 44 and sleeves 42 so as to rotate the shaft 40 and rotor 19 in opposite directions. Thus, each sleeve 42 is provided at its inner end with a split arcuate portion 47 disposed within a recess 48 in the corresponding gear 44, and a cam 49 is pivoted to the sleeve between the ends of the portion 47 and has an arm 50 so arranged that when the arm is swung away from the shaft 40, the cam 49 will expand the portion 47 and cause it to grip the wall of the recess 48, to rotate the sleeve with the gear, and the shaft 40 will rotate with the sleeve. It is apparent that one terminal of the portion 47 is slit loose from the sleeve so that the portion 47 may be expanded.

In order to control the clutches a grooved collar 51 is slidable on the shaft 40 and engages the spline 40' so as to rotate with said shaft 40, and said collar is engaged by a fork 52 secured to a rock shaft 53 mounted in the casing 39 and having a hand lever 54 secured thereto to be readily operated so as to control the device 13. A slide cam 55 is secured in the collar 51, by means of a screw 56 or otherwise, so as to move along the shaft 40, and the opposite ends of said cam are inclined or cut obliquely, as at 57, to engage adjustable screws 58 secured in the arms 50 of the clutches. When the lever 54 and collar 51 are in intermediate position, the slide cam 55 is also in intermediate position, and the clutch portions 47 are contracted, so that the gears 44 rotate without rotating the sleeves 42 and shaft 40. When the lever 54 is swung in one direction the collar 51 and cam 55 are moved so that one end of said cam wedges between the shaft 40 and screw 58 of the corresponding clutch arm 50, thereby swinging said arm away from the shaft 40 and causing the corresponding clutch portion 47 to expand and grip the gear wheel 44, so that the shaft 40 will be rotated in the same direction as said gear. By swinging the lever 54 in the opposite direction the other clutch is operated in the same way so that the shaft 40 is rotated with the other gear in the opposite direction. In this way, by moving the lever 54 to neutral or intermediate position the connection between the device 12 and motor 11 is opened, and by moving the lever 54 in opposite directions the operation of the device 12 may be reversed.

A bracket 59 is secured on the base 10 or base portion of the casing 39 and carries a clamp 60 embracing one end portion of a flexible metal hose 61 into which the shaft 14 extends. The hose 61 may be coiled up and will confine the free portion of the shaft 14 therein, so that said shaft may rotate within the hose 61 without flopping or whipping around as would be the case if the shaft extended from the device 13 without means to confine the shaft.

A bracket 62 is secured on the base 10 or base portion of the casing of the device 12 at the opposite end of the machine, and has a clamp 63 holding a tubular member 64 beyond the end of the rotor 19 and in alinement with said rotor for the passage of the shaft 14 through said member 64. A coupling member 65 is carried by the projecting end of the member 64 for connection with the pipe or tube to be cleaned. As shown, a nipple 66 is screwed into the coupling member 65 and receives a coupling member 67 on the end of the pipe or tube 68 which is to be cleaned. In fact, any suitable union or connection may be provided between the member 64 and pipe 68.

The member 64 has a stuffing box 70 at its opposite end into which a gland 69 is fitted, and said gland is secured in place by the stuffing box nut 71 screwed on the member 64. A washer 72 is seated in the stuffing box 70, and a tube 73 is secured to the member 64 in communication with said stuffing box and contains suitable packing material to be forced into the stuffing box by means of a screw 74 screw-threaded into said tube 73. The packing may thus be compressed into the stuffing box around the shaft 14 to prevent leakage of water at the point where the shaft 14 emerges from the pipe 68 and attaching member 64.

The member 64 has a lateral port 75 to which is connected a suitable faucet or valve 76, whereby said faucet or valve may be opened for the flow of water into or out of the pipe 68 while the shaft 14 is being operated within said pipe.

In operation, the member 64 is connected to the end of the pipe or tube 68, after said end of the pipe has been disconnected from the water meter, water main, branch pipe or other member to which it is connected, and it will be apparent that the machine may be connected in any suitable manner to the end of the pipe or tube to be cleaned. The shaft 14 has a fluted reamer, burr 77 or other tool on the end thereof, which is normally retracted within the member 64 so as to be out of the way when connecting the machine with the pipe. The motor 11 is then started, and the lever 54 moved in the direction to control the device 13 so that the rotor 19 is rotated in the proper direction to feed the shaft 14 forwardly into the pipe 68. At the same time, the shaft is rotated so that the tool 77 will scrape and clean the scale, sediment and other accumulations from the interior surface of the pipe 68. The shaft 14 may be of any suitable length so as to be projected entirely through the pipe 68, and the shaft 14 being flexible can negotiate the bends in the pipe. After the tool 77 has passed through the pipe, the device 13 is reversed, so as to reverse the rotary and longitudinal movements of the shaft 14, and the shaft is therefore retracted from the pipe, being rotated simultaneously in the opposite direction so as to complete the cleaning out of the pipe as the shaft is withdrawn therefrom. The water service pipes may thus be cleaned out quickly and effectively, thereby avoiding the necessity for replacing such pipes at much larger expense.

Having thus described the invention, what is claimed as new is:—

1. A pipe cleaning machine comprising a base, a member connected with the base and attachable to the terminal of a pipe to be cleaned, a flexible hose having one end connected with the base, a flexible rotatable shaft extending through said member and into said hose and adapted to be coiled up with said hose, and a device mounted on the base and having means engaging said shaft between said member and hose and operable for simultaneously rotating said shaft and moving it longitudinally from the hose into the pipe and reversely.

2. A pipe cleaning machine comprising a rotor, a shaft extending therethrough to enter a pipe, wheels carried by the rotor and clamping said shaft between them to rotate the shaft with the rotor, means for rotating said rotor to rotate the shaft and means for rotating said wheels to move the shaft longitudinally.

3. A pipe cleaning machine comprising a rotor, a shaft extending through the rotor to enter a pipe, wheels carried by the rotor and clamping said shaft between them for rotating the shaft with the rotor and for moving the shaft longitudinally, and means for rotating said wheels in opposite directions when the rotor is rotated in opposite directions.

4. A pipe cleaning machine comprising a rotor, a shaft extending therethrough to enter a pipe, wheels carried by the rotor and clamping said shaft between them to rotate the shaft with the rotor and to move the shaft longitudinally, means for rotating said wheels in opposite directions when said rotor is rotated in opposite directions, a power driven member, and reversing gearing between said member and rotor.

5. A pipe cleaning machine comprising a casing, a rotor mounted for rotation therein, a shaft extending through the rotor to enter a pipe, wheels carried by the rotor and clamping said shaft between them to rotate the shaft with the rotor and to move the shaft longitudinally, an internal annular worm in said casing, and a worm wheel engaging said worm and carried by said rotor and geared to said wheels to rotate said wheels during the rotation of the rotor.

6. A pipe cleaning machine comprising a rotor, a shaft extending therethrough to enter a pipe, a pair of grooved wheels carried by the rotor and gripping the shaft between them to rotate the shaft with the rotor, spring means to hold said wheels in tight engagement with the shaft, and means for rotating said wheels when the rotor is rotated to feed the shaft longitudinally.

7. A pipe cleaning machine comprising a base, a flexible hose, means connecting one end of said hose to the base, a flexible rotatable shaft extending into said hose and adapted to be coiled up therewith, and means mounted on the base for rotating said shaft and moving it longitudinally from the hose into a pipe and reversely.

In testimony whereof I hereunto affix my signature.

BENHEART AUGUST HOCHTRITT.